United States Patent [19]
Nielsen

[11] Patent Number: 5,890,164
[45] Date of Patent: Mar. 30, 1999

US005890164A

[54] ESTIMATING THE DEGREE OF CHANGE OF WEB PAGES

[75] Inventor: Jakob Nielsen, Atherton, Calif.

[73] Assignee: Sun Microsystems, Inc., Palo Alto, Calif.

[21] Appl. No.: 668,893

[22] Filed: Jun. 24, 1996

[51] Int. Cl.⁶ .................................................. G06F 17/30
[52] U.S. Cl. .............................................. 707/201; 707/10
[58] Field of Search ............................. 707/10, 201, 203, 707/204

[56] References Cited

U.S. PATENT DOCUMENTS

| | | | |
|---|---|---|---|
| 5,471,629 | 11/1995 | Risch | 707/201 |
| 5,479,654 | 12/1995 | Squibb | 707/201 |
| 5,561,793 | 10/1996 | Bennett et al. | 707/201 |
| 5,742,820 | 4/1998 | Perlman et al. | 707/201 |

*Primary Examiner*—Paul R. Lintz
*Attorney, Agent, or Firm*—McDermott, Will & Emery

[57] ABSTRACT

When monitoring a large number of information sources such as pages on the World Wide Web, a user may not have time to normally look at each source at regular intervals. A background process will connect to each source maintained in a database and calculate an estimate of how much the source has changed since the last time a user viewed it. The amount of change is graphically displayed to the user as part of an icon or file listing. The user can thus determine whether the amount of new material justifies connecting to the source.

17 Claims, 12 Drawing Sheets

| URL | NUMBER OF WORDS WHEN LAST SEEN | NUMBER OF PROPOSALS AND SIGNATURE NUMBERS WHEN LAST SEEN | DATE OF LAST USER ACCESS | ESTIMATE OF CHARGE |
|---|---|---|---|---|
| | | . . . | | |
| http://www.uspto.gov/news | 1236 | 13: 49050,44690, 38695,8175,68125, 39240,114450,35425, 22890,95375,50685, 56135,50685 | 6/4/96 | .35 |
| | | . . . | | |

| URL | NUMBER OF WORDS WHEN LAST SEEN | NUMBER OF PROPOSALS AND SIGNATURE NUMBERS WHEN LAST SEEN | DATE OF LAST USER ACCESS | ESTIMATE OF CHARGE |
|---|---|---|---|---|
| | | . . . . | | |
| http:// www.uspto gov/news | 1236 | 13: 49050,44690, 38695,8175,68125, 39240,114450,35425, 22890,95375,50685, 56135,50685 | 6/4/96 | .35 |
| | | . . . . | | |

Figure 2 http://www.uspto.gov/news

YELLOW

ESTIMATING THE DEGREE OF CHANGE OF WEB PAGES

BACKGROUND OF THE INVENTION

1. Field of the Invention

The invention relates to computer systems and particularly to the display of how much a file has changed between one time when a user viewed the file and a subsequent time.

2. Description of Related Art

Users are faced with increasing information overload, especially when using the worldwide web portion of the internet (WWW) which has hundreds of thousands of web sites and millions of web pages. Users often wish to monitor an information source, such as a web page, for changing information but do not have time to manually look at the source at regular intervals.

The Netscape Navigator™ has a feature called "What's New" that works on a user-defined set of bookmarks. The feature connects to all of the web pages included in the user's bookmark list and checks each one to determine whether its modification date is more recent than the last time the user saw the page. This method does not allow a user to estimate how "much" the page has changed. In fact, any change, no matter how minimal (e.g., correcting a typo), is treated the same, and the modification date may actually have changed without "any" changes in the document (e.g., if a comment was changed or if the file was overwritten for some reason).

SUMMARY OF THE INVENTION

The present invention provides apparatus, systems, processes and computer program products which provide a monitoring mechanism that informs users when a web page in which they are interested has changed and indicates how much it has changed. This is accomplished with the help of a database of monitored web pages which the user keeps. This database is an extension of the current bookmark list and includes the following information for each web page that is monitored:

1. The URL of the page;
2. The length of the page in words when it was last seen;
3. The number of paragraphs in the page and a "signature" number for each paragraph;
4. The date when it was last accessed; and
5. An estimate of change between the current page and the page as last seen Two measures of change are computed, one is based on the raw number of words in each web page or file. The second is based on a paragraph by paragraph change measure calculated for the entire document.

The invention relates to a system for displaying information about changes in files on one or more file servers, including a network, one or more file servers connected to the network, and a computer, having a database and a display, connected to the network and configured to periodically access files listed in the database over the network and to determine the amount the files have changed since the last time a user viewed the files and to display an indication of how much a file has changed. The computer accesses files listed in the database in a background mode. The computer determines the amount files have changed by comparing information stored in the database at a time a user last viewed the file with information in the file at the time of access.

One type of comparing information involves comparing word counts for the file. A change estimate is derived by determining the absolute value of the difference between the word count at the time a user last viewed the file and the word count at the time of access and dividing that absolute value by the maximum of the two word counts.

Another type of comparing information involves comparing signature numbers for paragraphs of the file. Signature numbers are calculated for a paragraph by assigning white space characters and punctuation a value of zero, assigning upper case characters their corresponding lowercase counterpart's ASCII value, eliminating comments, summing all character values in the paragraph and saving only the low order 32 bits. Comparing signature numbers for paragraphs of different versions of a file includes matching corresponding signature numbers.

A paragraph change estimate is calculated for each paragraph by determining the absolute value of the difference between the paragraph signature number at the time a user last viewed the file and the paragraph signature number at the time of access and dividing that absolute value by the maximum of a number of paragraphs at the time a user last viewed the file and a number of paragraphs at the time of access. The computer determines the amount files have changed by calculating a change estimate based on word count and a change estimate based on paragraph signature numbers and by selecting the larger value of change estimates as the value of the amount files have changed. The computer displays a glyph or an icon with a pie chart indicating approximately the amount files have changed.

The database includes one or more records, each record containing a field containing a URL, a word count when a file was last seen by a user, a number of paragraphs and a list of signature numbers, a date of last user access to the file and an estimate of change.

The invention also relates to apparatus for displaying information about changes in files, including a memory having a database stored thereon, the database containing a list of file locations, and a computer, connected to the memory and configured to periodically access files listed in the database to determine the amount the files have changed since the last time a user viewed the files and to display that estimate for the user each time a information about a file is displayed.

The invention is also directed to a method for displaying information about changes in files by storing information about a file each time a user views the file, subsequently accessing the file without a user viewing it, calculating an estimate of change of the file between a time when a user last viewed the file and a subsequent access of the file, and displaying an estimate of change each time information about the file is displayed.

The invention is also directed to a computer program product, including a memory, and a computer program stored on the memory. The computer program contains instructions for storing information about a file each time a user views the file, subsequently accessing the file without a user viewing it, calculating an estimate of change of the file between a time when a user last viewed the file and a subsequent access of the file, and displaying an estimate of change each time information about the file is displayed.

Still other objects and advantages of the present invention will become readily apparent to those skilled in the art from the following detailed description, wherein only the preferred embodiment of the invention is shown and descried, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

The objects, features and advantages of the system of the present invention will be apparent from the following description in which:

FIG. 2 is a database organized as an exemplary bookmark list for storing information about a web page document or file.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1A:
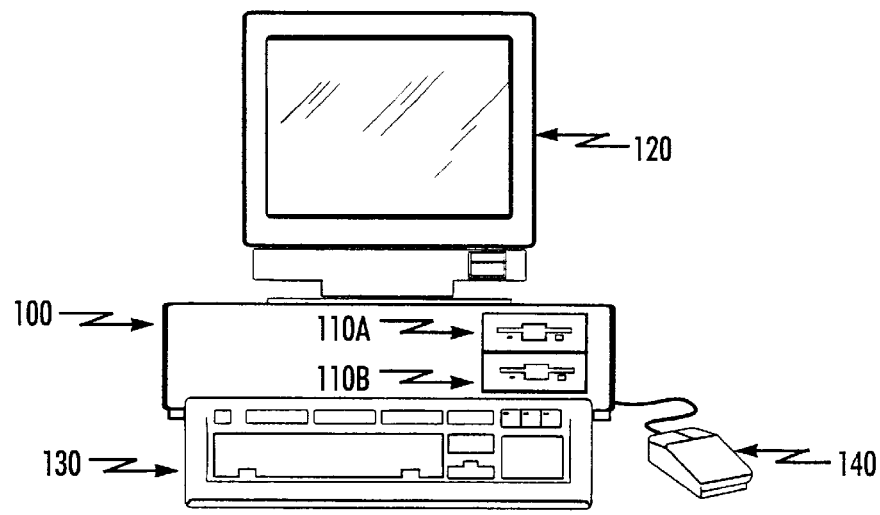
FIG. 1A illustrates a computer of a type suitable for carrying out the invention.

FIG. 1A illustrates a computer of a type suitable for carrying out the invention. Viewed externally in FIG. 1A, a computer system has a central processing unit 100 having disk drives 110A and 110B. Disk drive indications 110A and 110B are merely symbolic of a number of disk drives which might be accommodated by the computer system. Typically, these would include a floppy disk drive such as 110A, a hard disk drive (not shown externally) and a CD ROM drive indicated by slot 110B. The number and type of drives varies, typically, with different computer configurations. The computer has the display 120 upon which information is displayed. A keyboard 130 and a mouse 140 are typically also available as input devices. Preferably, the computer illustrated in FIG. 1A is a SPARC workstation from Sun Microsystems, Inc.

Figure 1B:
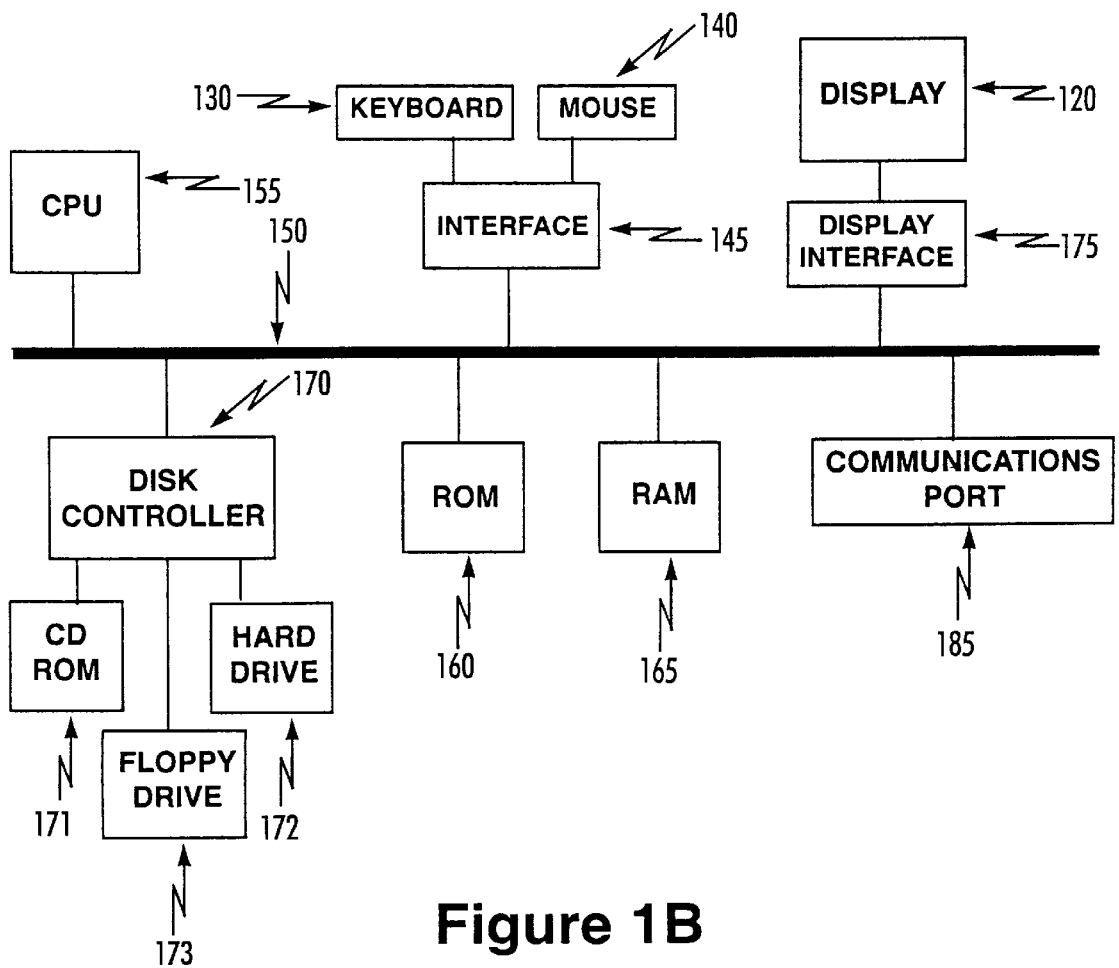
FIG. 1B illustrates a block diagram of the computer of FIG. 1A.

FIG. 1B illustrates a block diagram of the internal hardware of the computer of FIG. 1A. A bus 150 serves as the main information highway interconnecting the other components of the computer. CPU 155 is the central processing unit of the system, performing calculations and logic operations required to execute programs. Read only memory (160) and random access memory (165) constitute the main memory of the computer. Disk controller 170 interfaces one or more disk drives to the system bus 150. These disk drives may be floppy disk drives, such as 173, internal or external hard drives, such as 172, or CD ROM or DVD (Digital Video Disks) drives such as 171. A display interface 175 interfaces a display 120 and permits information from the bus to be viewed on the display. Communications with external devices can occur over communications port 185.

Figure 1C:
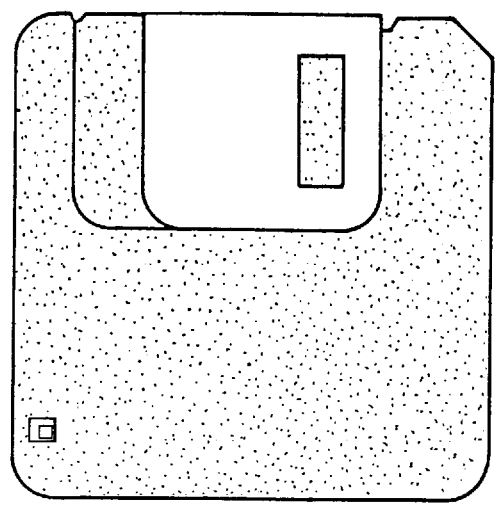
FIG. 1C illustrates an exemplary memory medium containing one or more programs usable with the computer of FIG. 1A.

FIG. 1C illustrates an exemplary memory medium which can be used with drives such as 173 in FIG. 1B or 110A in FIG. 1A. Typically, memory media such as a floppy disk, or a CD ROM, or a Digital Video Disk will contain the program information for controlling the computer to enable the computer to perform its functions in accordance with the invention.

FIG. 2 is a database organized as an extended bookmark list for storing information about a web page, document or file. The database is organized with five major fields. The first is the uniform resource locator (URL) used for identifying a document on the worldwide web. The second includes the number of words that document contained when it was last seen. The third field is a composite listing first the number of paragraphs contained in the document and then a list of signature numbers for each paragraph calculated as of the time the document was last seen by the user. The fourth field is the date of last user access. The last field is an estimate of change as described more hereinafter.

Figure 3:
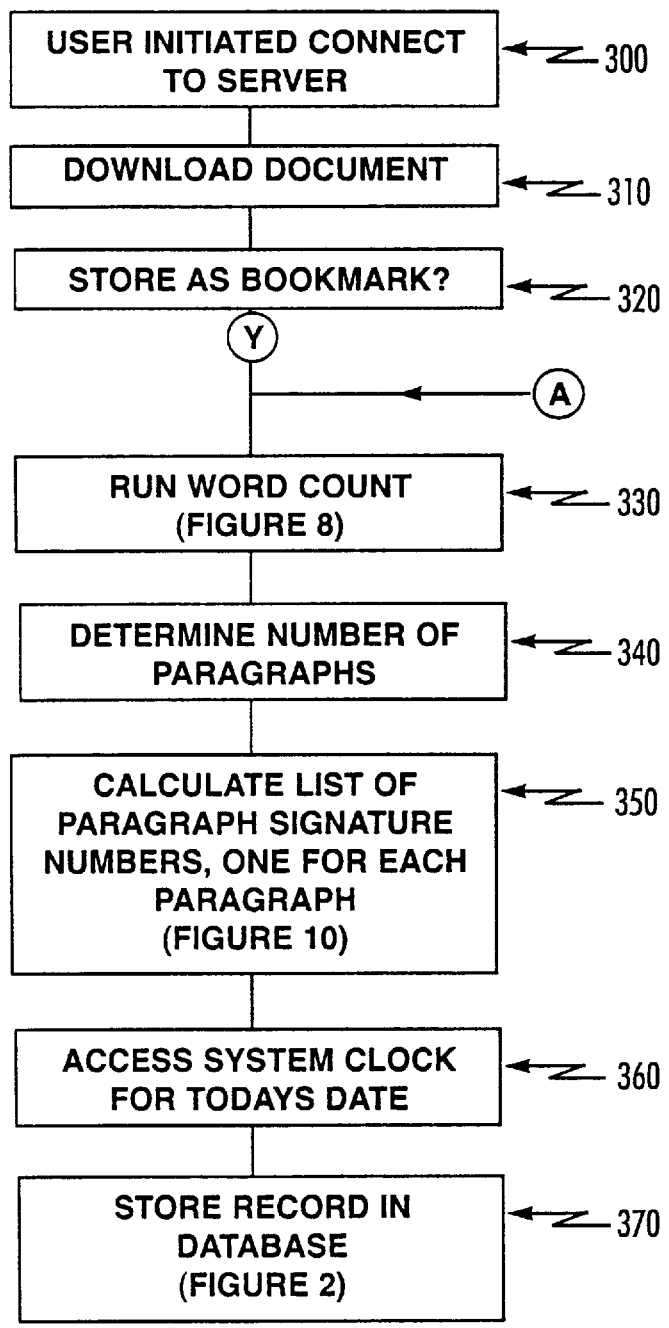
FIG. 3 is a flow chart of a process for loading a bookmark record into the database.
Figure 8:
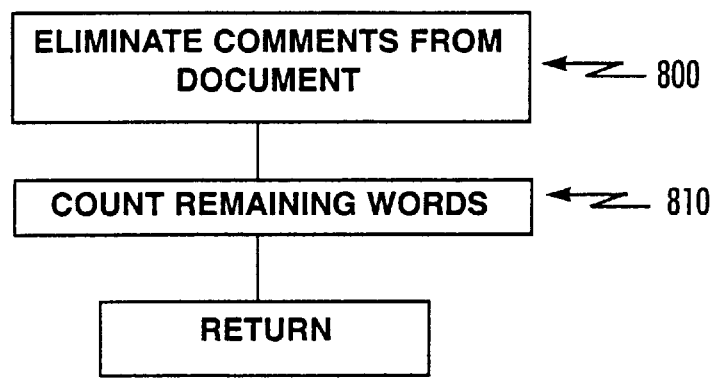
FIG. 8 is a flow chart of a word count procedure used in FIG. 7.

FIG. 3 is a flow chart of a process for loading a bookmark record into the database. When the user initiates a connection to a server (300) and downloads a document (310), the user has an option to choose to store information about the document as a bookmark (320). If the user exercises that option (320-Y), a word count routine (as shown in FIG. 8) is run against the document stored on the server. Then, the number of paragraphs in the document is determined (340).

The definition of a "paragraph" will depend on the encoding format of the documents used by the system. For plain-text ASCII documents, paragraphs are normally separated by two or more consecutive new lines (line feeds). For web pages, paragraphs have explicit mark-up tags as separators. Tags that start new paragraphs include the <P> tag, horizontal rules <HR>, as well as any heading tag <Hn> (where n is an integer), list elements <LI>, table cell tag <TD>, and block quote tags <PRE> and <BLOCKQUOTE>.

Figure 10:
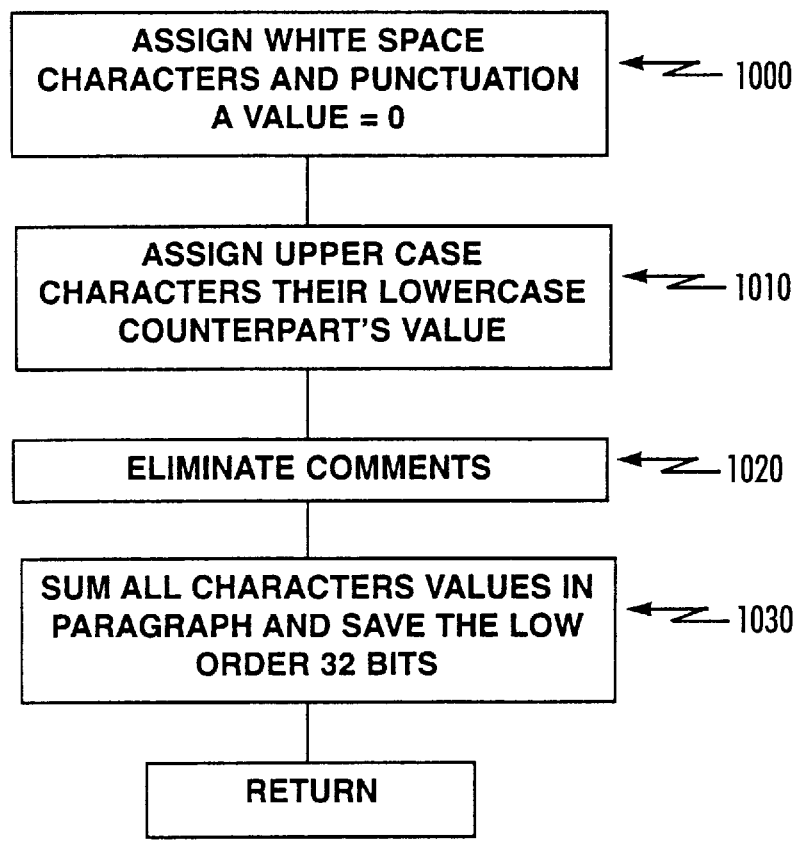
FIG. 10 is a flow chart of a procedure for calculating a paragraph signature number used in FIG. 9.

A list of paragraph signature numbers is calculated, one for each paragraph as shown in FIG. 10 (350). The system clock is accessed to obtain today's date and the information derived is stored as a record in the database as shown in FIG. 2 (370).

Figure 4:
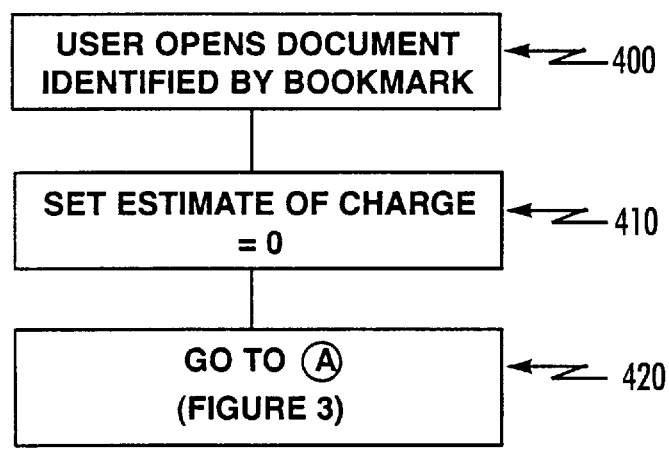
FIG. 4 is a flow chart of a process for reading a database entry when a user views a document or file.

FIG. 4 is a flow chart of a process for revising a database entry when a user views a document or file. Whenever a user opens a document identified by a bookmark (400), the estimate of change is set to zero (410) and the analysis of the revised document then occurs as described at blocks 330, 340, 350, 360 and 370 as set forth in FIG. 3. The linkage to the FIG. 3 flow chart is indicated at block 420 by reference to the continuation letter "A".

Figure 5:
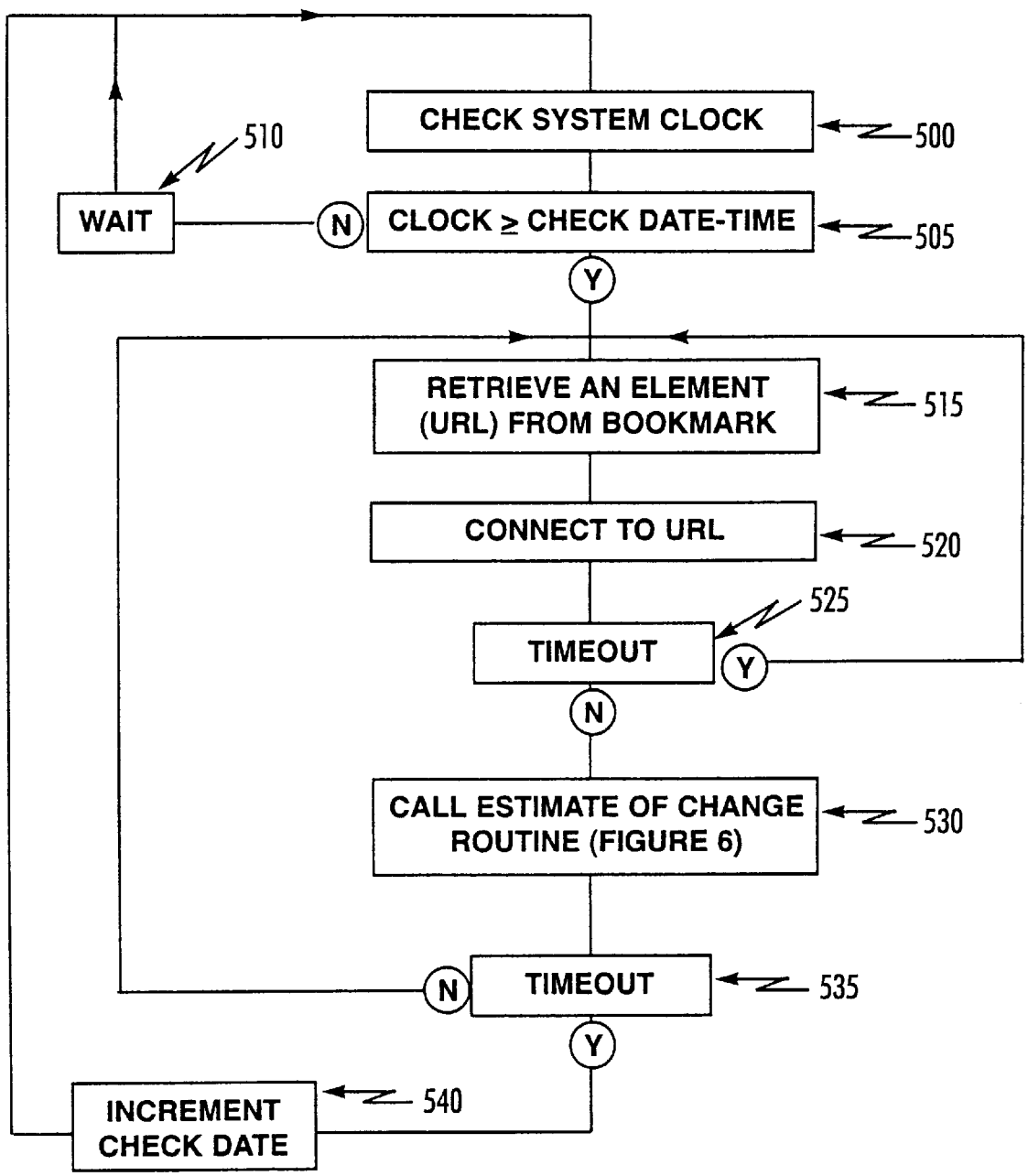
FIG. 5 is a flow chart of a process for estimating the amount a document or file has changed since the last time a user viewed it.

FIG. 5 is a flow chart of a process for estimating the amount a document or file has changed since the last time a user viewed it. The process described in the flow chart of FIG. 5 is essentially a timing process which triggers a check of each individual item in the extended bookmark database periodically. Preferably, for a person active on the internet, this would be once a day. Preferably, the check time would be set to occur off hours when no one would be using the computer and when traffic on the internet might be low. Also preferably, the process will run in background. Items 500, 505 and 510 form a timing loop in which the system clock is checked (500) and a determination made whether the system clock value is greater than the check time set by the user (505). If it is not, a period of time will elapse (510) before the clock is checked again. The wait duration of block 510 might be an hour in a typical installation, but can be set by the user as desired. When the system clock exceeds or equals check time (505-Y), the database is accessed and a URL is retrieved from the database (515) and the computer attempts connects to the URL specified in the record of the database (520). If the connection is accomplished before a time out period, say five minutes, processing continues (525-N). If a connection is not established before time out occurs, the database record will be closed out and the next element retrieved from the database. If the connection is successful, the estimate of change routine described in FIG. 6 will be called (530) and when it completes a check will be made to determine if the last URL in the database has been checked (535). If it is not the last URL, the system will loop back (535-N) to before block 515 and the process of checking URLs will continue until all have been completed. When the last one has been checked (535-Y) the check date will be incremented (540) and control will return to the timing loop at the beginning of the process.

Figure 6:
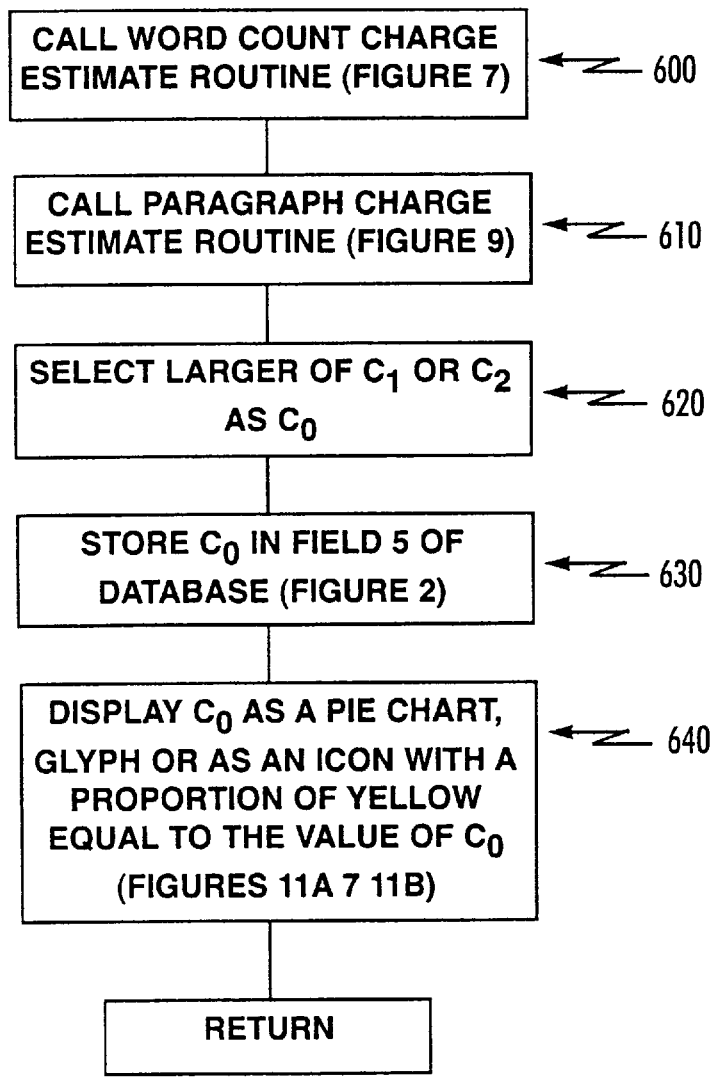
FIG. 6 is a flow chart of an estimate of change routine shown in FIG. 5.
Figure 7:
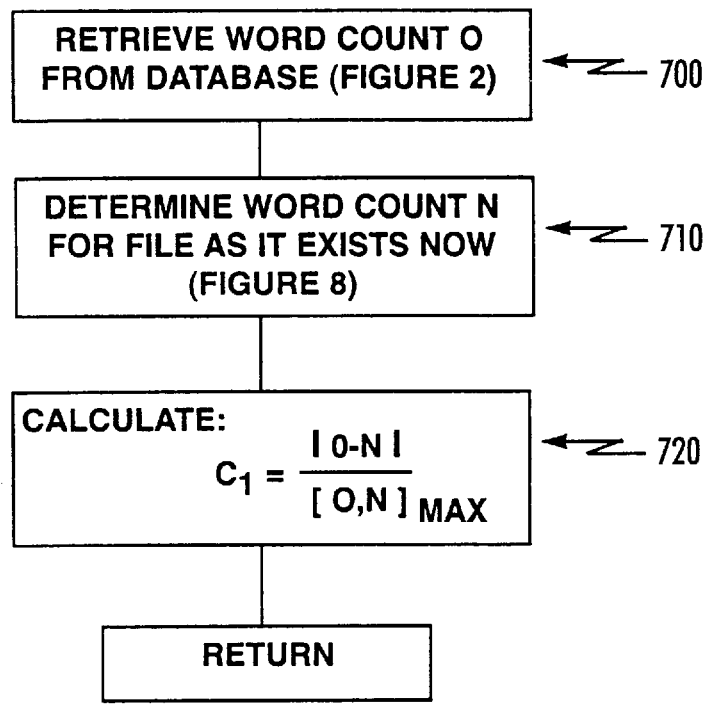
FIG. 7 is a flow chart of a word count change estimate routine shown in FIG. 6.
Figure 9:
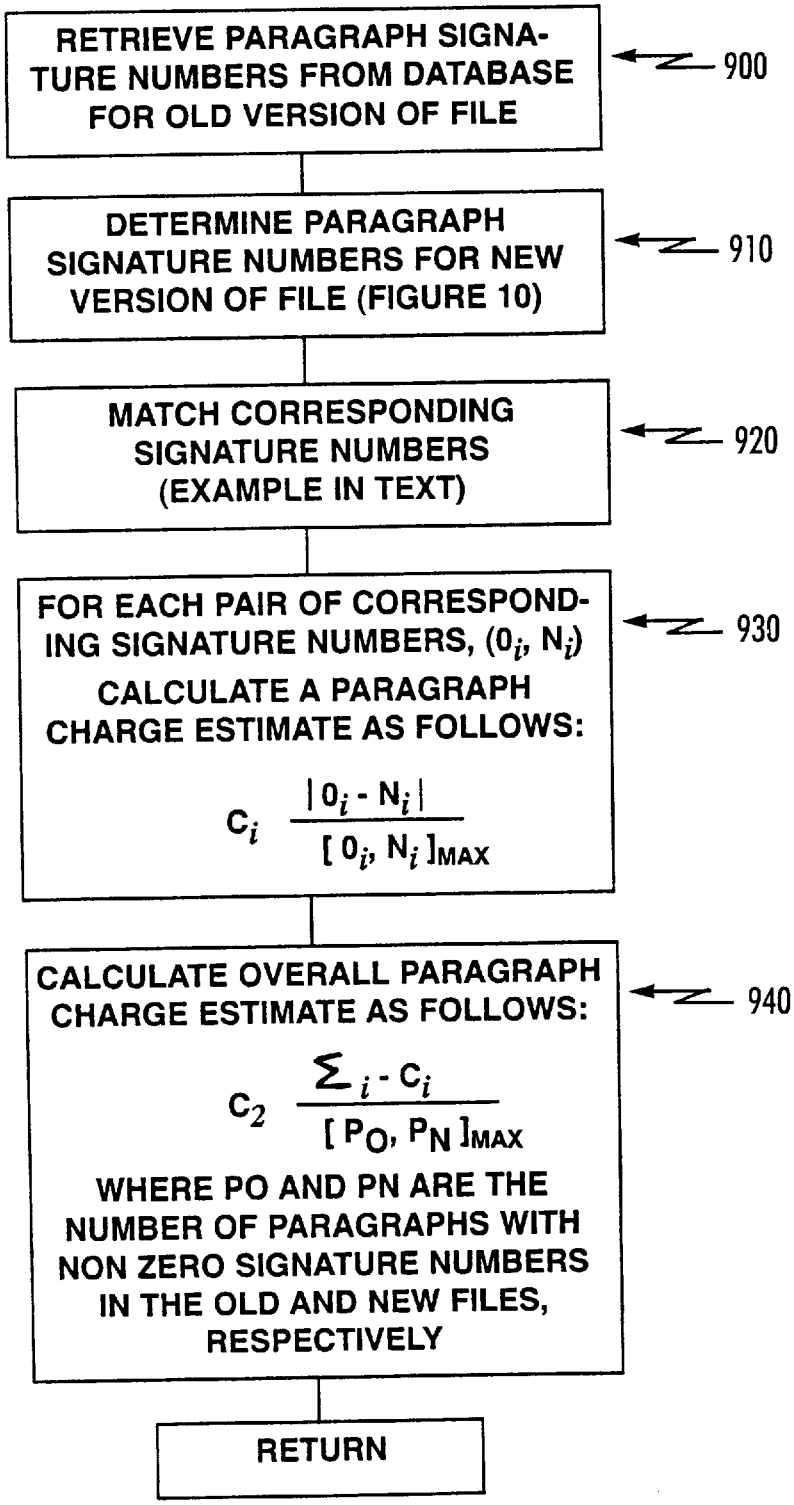
FIG. 9 is a flow chart of a second change estimate routine using paragraph signature numbers.

FIG. 6 is a flow chart of an estimate of change routine shown in FIG. 5. The process begins with a call to word count estimate routine (FIG. 7) followed by a call to the paragraph change estimate routine shown in FIG. 9 (610). As described more hereinafter, the results of the change estimate routines of FIG. 7 and FIG. 9 are two values, $C_2$ and $C_2$. The larger of these values is selected as the change estimate $C_0$ (620) to be stored in field 5 of the database of FIG. 2 (630). The value $C_0$ is displayed as a pie chart, glyph or as an icon with a proportion of yellow equal to the value of $C_0$. See FIGS. 11A and 11B (640).

FIG. 7 is a flow chart of a word count change estimate routine shown in FIG. 6. The database record for the URL being processed is opened and the word count, O, from the database is retrieved (700). A word count routine shown in FIG. 8 is utilized to determine the word count, N, for the current version of the file (710). A value $C_1$ is calculated (720) by taking the absolute value of the difference between O and N and dividing that quantity by the maximum value of O or N.

FIG. 8 is a flow chart of a word count procedure used in FIG. 7. When counting words, all comments are eliminated from the document (800). The remaining words are then counted (810) and the process returns.

FIG. 9 is a flow chart of a second change estimate routine using paragraph signature numbers. The database record for the URL in question is opened, if not already open, and the set of paragraph signature numbers is retrieved from the database for the version of the file as it existed at the last time the user viewed it.

Signature numbers for the current version of the file as it exists at the time of the background or actual access are determined as shown in FIG. 10 (910). A matching process is undertaken as described in the text hereinafter which matches corresponding signature numbers between the old and the new version of the file (920). For each pair of corresponding signature numbers, $(O_i, N_i)$, a paragraph change estimate is calculated as follows:

$$C_i \frac{|O_i - N_i|}{[O_i, N_i]_{max}} \quad (1)$$

An overall paragraph change estimate is then calculated by summing all values of $C_i$ and dividing them by the maximum number of paragraphs having nonzero signature numbers from the old and the new files (940).

FIG. 10 is a flow chart of a procedure for calculating a paragraph signature number used in FIG. 9. First, whitespace characters and punctuation marks are assigned a value of 0 (1000). Upper case characters are assigned the values of their lower case counterparts (1010). Comments are eliminated (1020) and then the sum of all character values in the paragraph are added and the lower of 32 bits of that sum are saved.

An example of how the calculations are done utilizing the examples shown in the database record illustrated in FIG. 2 will be undertaken using Table 1 as follows:

TABLE I

| Words (Original) | Paragraph Signature Numbers (Original) | Words (Revised) | Paragraph Signature Numbers (Revised) | $C_i$ |
|---|---|---|---|---|
| 90 | 49050 | 90 | 49050 | 0 |
| 82 | 44690 | 0 | 0 | 1 |
| 71 | 38695 | 71 | 38695 | 0 |
| 15 | 8175 | 15 | 8175 | 0 |
| 125 | 68125 | 125 | 68125 | 0 |
| 0 | 0 | 93 | 50685 | 1 |
| 72 | 39240 | 72 | 39240 | 0 |
| 210 | 114450 | 210 | 114450 | 0 |
| 65 | 35425 | 65 | 35425 | 0 |
| 42 | 22890 | 0 | 0 | 1 |
| 0 | 0 | 84 | 45780 | 1 |
| 0 | 0 | 56 | 30520 | 1 |
| 175 | 95375 | 175 | 95375 | 0 |
| 93 | 50685 | 93 | 50685 | 0 |
| 103 | 56135 | 103 | 56135 | 0 |
| 93 | 50685 | 93 | 50685 | 0 |
| 1236 | 673620 | 1345 | 733025 | 5 |
| | $P_o = 13$ | | $P_r = 14$ | |

Table I is divided into information relating to the original file as last viewed by the user and the "revised" file as currently or most recently perceived by the system. The particular arrangement of data in Table I includes the matching information resulting from the process described above. That is, a zero in a column relating to an original version of the file indicates that paragraph was not in the original but was added in the revised version. On the other hand, a zero in the revised columns indicates that a paragraph which was in the original version has been deleted and is no longer in the file.

The first measure of change is one based on word count. As indicated above, comments are removed and the remaining words are counted for the entire document. In the example shown in Table I, there were 1236 words in the original version of the file whereas there are now 1345 words. Using the formula shown in block 720 of FIG. 7, $$C_1 = \frac{|1236 - 1345|}{[1236, 1345]_{max}} = \frac{109}{1345} = .08 \quad (2)$$

The paragraph change estimate method described in FIG. 9 requires a paragraph by paragraph comparison of the original and revised paragraph signature numbers. A value $C_i$ is calculated as shown in block 930 of FIG. 9. For simplicity, in the example, entire paragraphs are added or deleted. This results in values for $C_i$ of only 0 or 1. However, in a real calculation, some paragraphs may be slightly modified resulting in fractional values for $C_i$. The sum of all values of $C_i$ are added as shown in Table I and stored. As shown in Table I, there are 13 paragraphs in the original version of the file and 14 in the revised version. Thus, using the formula shown in block 940 of FIG. 9, the value for the second measure of change is calculated as follows:

$$C_2 = \frac{5}{[13, 14]_{max}} = \frac{5}{14} = .35 \quad (3)$$

The number 5 is the sum of all values of $C_i$.

The estimate of change to be displayed on the computer screen is the larger of the two change estimates. In this case, the change estimate to be displayed shows 35 percent new material in the file.

Figure 11A:
FIG. 11A and 11B illustrate exemplary ways in which estimates of change for a document or file may be displayed.
Figure 11B:
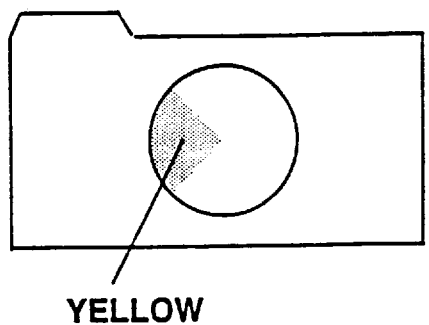

FIGS. 11A and 11B illustrate exemplary ways in which the estimate of change for a document or file may be displayed. In FIG. 11A, a glyph in the form of a pie chart with a yellow filled in area indicating the amount of change may be positioned as part of a directory display of a particular file as shown in FIG. 11A. A glyph is a predefined character of a character set. There may be 10 glyphs, each with progressively more yellow showers, one of which would be selected as part of a display; depending on the percent of change. Alternatively, an icon can be or be modified to include a pie chart in its center showing the 35 percent new material in yellow, as illustrated in FIG. 11B.

The browser calculates a signature number for each paragraph in the page, with the exception of paragraphs that have a zero signature. Paragraphs with a signature of zero are not included in the list of paragraph signatures maintained in the database of monitored pages.

The signature of a paragraph is calculated as the sum of the character values of all the characters in the paragraph, with the following exceptions:

A. Any characters that are considered whitespace or punctuation is assigned a value of zero. Whitespace includes space, NULL, CR, and LF.

Punctuation includes, . : ; / \ | ? ! -_ and all quotation mark characters.

B. If the document uses a character set for which the concepts of upper and lower case are defined, then any upper case characters are assigned the value of their corresponding lower case characters.

C. Any characters included as part of a comment are not counted. If the document is an HTML document, comments are assumed to be any text within the delimiters <!-- and -->.

Any paragraph that has a signature of zero is not included in the list of signature numbers and is not included in the count of number of paragraphs in the page.

To save storage space in the case of very long paragraphs, only the low-order 32 bits of the sum are saved and used in the comparisons.

Note that the definition of the signature number ensures that a paragraph will have the same signature even if it has been subjected to certain forms of editing, including any changes in comments, any corrections of typos that involve moving words or characters around, and any changes in punctuation.

When comparing two lists of paragraph signatures (the list for the previously seen version of the page as stored in the database field 3 and the list for the newly downloaded version of the page), the browser matches up the signature numbers as follows:

The browser compares the numbers on the two lists starting from the top. If, for a given comparison, the two signature numbers are the same, they are considered a match, and the browser continues down to the next number on each of the two lists. If the two numbers being compared are "not" the same, the browser attempts to find a better match by assuming that one or more paragraphs may have been added or deleted. This is done as follows:

The system looks at the next N elements in the lists starting with the two numbers being considered. The recommended value of N is 5, but for simplicity, the following example is illustrated with N=3. If neither list has N remaining elements, then N is set equal to the number of remaining elements in the list with the most remaining elements. If one of the lists has fewer than N remaining elements, then it is temporarily padded with a sufficient number of zeros to give it N remaining elements.

The system then considers all cases where between none and N-1 zero-value list elements have been inserted in the two lists. Inserting a zero value in a list is done by pushing the remaining list elements down by one position and removing the last list element. No cases are considered where a zero is inserted in the same position in both lists (that would correspond to a paragraph having been removed from both versions of the document). Note that these sublists are constructed as temporary data structures: no change is made to the original lists.

The following example shows how this procedure is done to compare two lists with three elements: (A B C) and (D E F). Since N is 3, we have to consider cases with 0, 1, and 2 zeros inserted.

Original list (no zeros inserted):
A<->D
B<->E
C<->F

Cases where no zero-value list elements are inserted at the top of the list:
A<->D
O<->E
B<->F
A<->D
O<->E
O<->F
A<->D
O<->E
B<->O
A<->D
B<->O
C<->E
A<->D
B<->O
O<->E
A<->D
B<->O
C<->O
A<->D
B<->E
O<->F
A<->D
B<->E
C<->E Cases where a zero-value list element has been inserted at the top of the left list:
O<->D
A<->E
B<->F
O<->D
O<->E
A<->F
O<->D
A<->O
B<->E
O<->D
A<->E
O<->F
O<->D
A<->E
B<->O Cases where a zero-value list element has been inserted at the top of the right list:
A<->O
B<->D
C<->E
A<->O
O<->D
C<->E

A<->O
B<->O
C<->D
A<->O
B<->D
O<->E
A<->O
B<->D
C<->O

The system computes the sum of the paragraph change estimates between the matching positions in the two lists and identifies the case with the smallest sum. This case is assumed to be the best guess as to inserted and removed paragraphs. If this case is one where both of the top list elements were left at their original values, then the system assumes that the two values are a match and continues with its comparison of the two lists. Otherwise, the system inserts a zero at the top of the remaining elements for the list for which the smallest-sum case had a zero on the top. Note that this insertion is done by pushing all the list elements down the list and thus making the list one element longer (this is in contrast to the temporary padding of the sublists used to compare all the cases with ) to N-1 zeros; here the last list element is removed when a zero is added to a sublist). The system continues with its comparison of the remaining elements of the two lists. Note that only a single list element was added to one of the two remaining lists, even if more than one zero was added to the sublists in the case that produced the minimum change sum.

The paragraph change estimate between two signature numbers is defined as the absolute difference between the two numbers divided by the largest of the two numbers. Note that this definition implies that the change estimate is 1.0 if one of the signature numbers is zero.

The change measure is defined as the sum of the paragraph change estimates divided by the maximum of the number of paragraphs with non-zero signature numbers in the old and new page.

Although the disclosure has been shown in the context of the worldwide web, it clearly applies to any system in which information is stored remotely from the user.

The invention overcomes the problems of the prior art and permits a user to quickly identify those areas of interest which have not changed substantially since the last time he viewed them. He may therefore prioritize his activities to consider only those areas which have changed substantially since last he viewed them.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

I claim:

1. A system for displaying information about changes in files on one or more file servers, comprising:
   a. a network;
   b. one or more file servers connected to said network; and
   c. a computer, having a database and a display, connected to said network and configured to periodically access files listed in said database over said network and to determine the amount the files have changed since the last time a user viewed the files and to display an indication of how much a file has changed.

2. The system of claim 1 in which said computer accesses files listed in said database in a background mode.

3. The system of claim 1 in which said computer determines the amount files have changed by comparing information stored in said database at a time a user last viewed the file with information in the file at the time of access.

4. The system of claim 3 in which comparing information involves comparing word counts for the file.

5. The system of claim 4 in which comparing word counts includes deriving a change estimate by determining the absolute value of the difference between a first word count at the time a user last viewed the file and a second word count at the time of access and dividing that absolute value by the maximum of the first word count and the second word count.

6. The system of claim 3 in which comparing information involves comparing signature numbers for paragraphs of the file.

7. The system of claim 6 in which signature numbers are calculated for a paragraph by assigning white space characters and punctuation a value of zero, assigning upper case characters their corresponding lowercase counterpart's ASCII value; eliminating comments, summing all character values in said paragraph and saving only the low order 32 bits.

8. The system of claim 5 in which comparing signature numbers for paragraphs of the file includes matching corresponding signature numbers.

9. The system of claim 8 in which a paragraph change estimate is calculated for each paragraph by determining the absolute value of the difference between the paragraph signature number at the time a user last viewed the file and the paragraph signature number at the time of access and dividing that absolute value by the maximum of a number of paragraphs at the time a user last viewed the file and a number of paragraphs at the time of access.

10. The system of claim 1 in which said computer determines the amount files have changed by calculating a change estimate based on word count and a change estimate based on paragraph signature numbers and by selecting the larger value of change estimates as the value of the amount files have changed.

11. The system of claim 10 in which said computer displays a glyph indicating approximately the amount files have changed.

12. The system of claim 10 in which said computer displays an icon indicating approximately the amount files have changed.

13. The system of claim 10 in which said computer displays an icon with a pie chart indicating approximately the amount files have changed.

14. The system of claim 1 in which said database includes one or more records, each record containing a field containing a URL, a word count when a file was last seen by a user; a number of paragraphs and a list of signature numbers; a date of last user access to said file and an estimate of change.

15. Apparatus for displaying information about changes in files, comprising:

a. a memory having a database stored thereon, said database containing a list of file locations; and b. a computer, connected to said memory and configured to periodically access files listed in said database to determine an estimate of the amount the files have changed since the last time a user viewed the files and to display that estimate for the user.

16. A method for displaying information about changes in files comprising the steps of:

a. providing an element for performing the step of storing information about a file;

b. providing an element for performing the step of subsequently accessing the file without a user viewing it;

c. providing an element for performing the step of calculating an estimate of change of the file between a time when a user last viewed the file and a subsequent access of said file; and d. providing an element for performing the step of displaying an estimate of change when information about the file is displayed.

17. A computer program product, comprising:

a. a memory; and b. a computer program stored on said memory, said computer program containing instructions for storing information about a file when a user views the file, subsequently accessing the file without a user viewing it, calculating an estimate of change of the file between a time when a user last viewed the file and a subsequent access of said file; and displaying an estimate of change when information about the file is displayed.

* * * * *

UNITED STATES PATENT AND TRADEMARK OFFICE
CERTIFICATE OF CORRECTION

PATENT NO. : 5,890,164
DATED : March 30, 1999
INVENTOR(S) : Jakob Nielsen

It is certified that error appears in the above-identified patent and that said Letters Patent is hereby corrected as shown below:

In the Claims:

Claim 16, Line 27, after "calculating an estimate of"
    insert --the amount of--;
Claim 16, Line 31, after "displaying an estimate of"
    insert --the amount of--;
Claim 17, Line 39, after "calculating an estimate of"
    insert --the amount of--;
Claim 17, Line 41, after "displaying an estimate of"
    insert --the amount of--.

Signed and Sealed this

Twenty-seventh Day of July, 1999

Attest:

Q. TODD DICKINSON

*Attesting Officer*  *Acting Commissioner of Patents and Trademarks*